Sept. 3, 1946.                F. C. IELFIELD                    2,406,773
                               CEREAL CUTTER
                            Filed Oct. 7, 1944              2 Sheets-Sheet 2
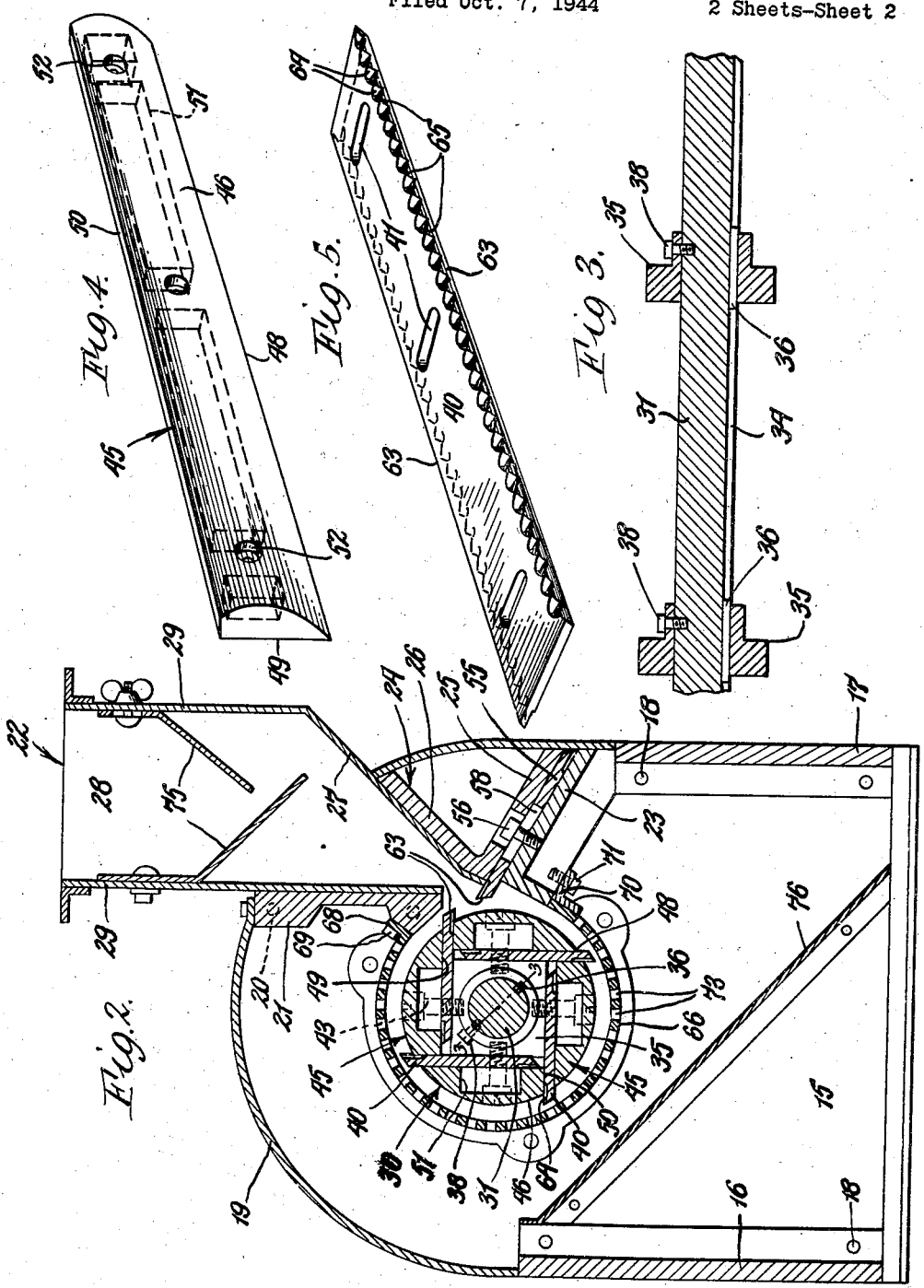
INVENTOR.
Fred C. Ielfield
BY
Popp and Popp
ATTORNEYS Patented Sept. 3, 1946

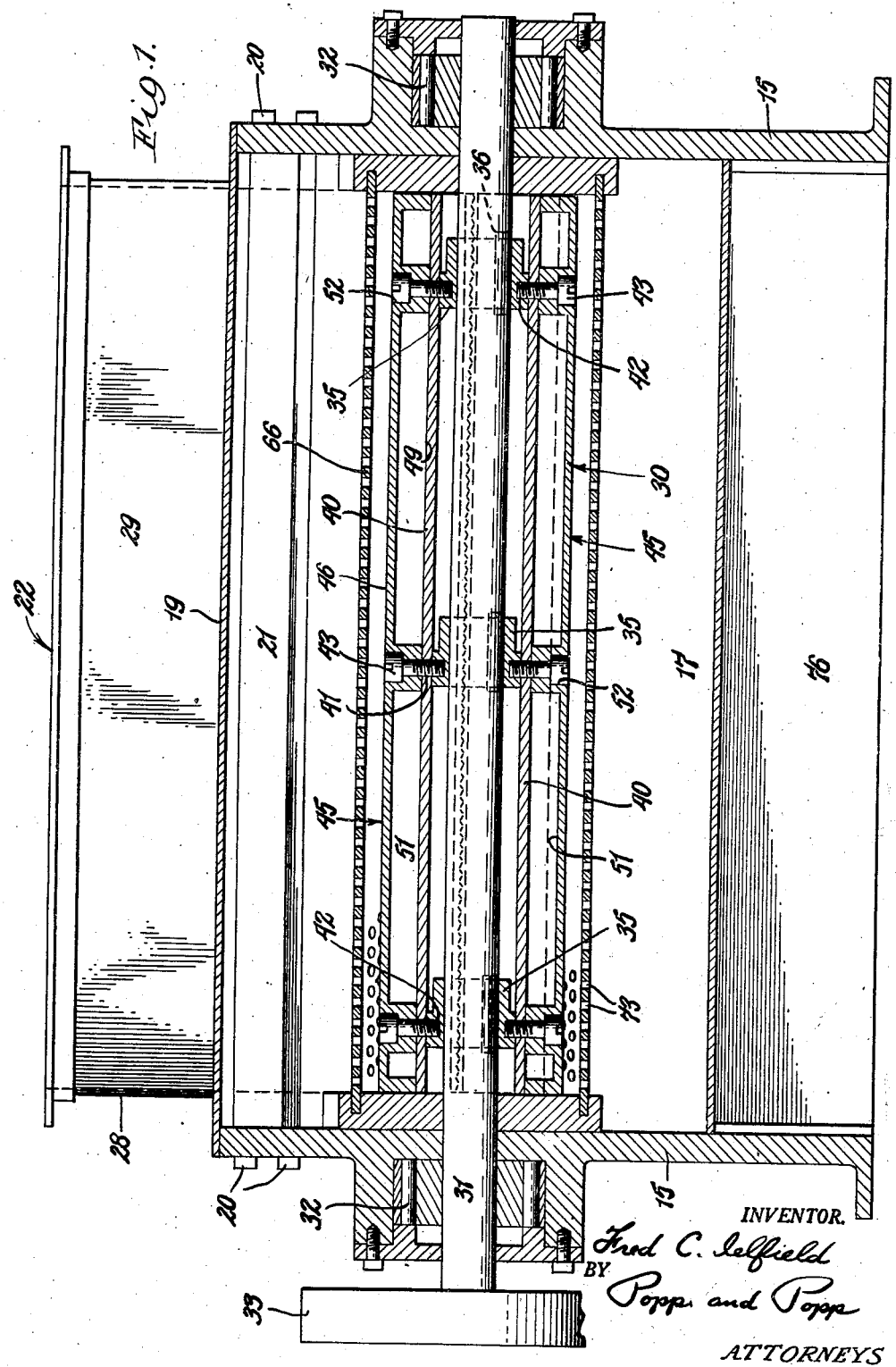

2,406,773

UNITED STATES PATENT OFFICE 2,406,773

CEREAL CUTTER

Fred C. Ielfield, Silver Creek, N. Y., assignor to Silver Creek Precision Corporation, Silver Creek, N. Y., a corporation of New York Application October 7, 1944, Serial No. 557,627

1 Claim. (Cl. 146—71.5)

This invention relates to a cereal cutter and more particularly for cutting corn, wheat, rye, beans, oats and all other hard cereal grains from whole kernels in the preparation of chicken and animal feed. This invention is an improvement on the cereal cutter described and claimed in my United States Patent No. 1,973,169, dated September 11, 1934.

The principal object of this invention is to provide a cereal cutter which requires a very small amount of power to operate and which will rapidly and efficiently cut large amounts of grains to a desired uniform maximum size and in which all grinding action is avoided so that practically the entire output is of a uniform size as compared with cutters now on the market which produce a relatively large amount of very small pieces of grain and powder.

Another object of the present invention is to provide such a cutter which will handle large amounts of material and will not choke or clog up, special provision being made to prevent the grain being cut from compacting in the throat adjacent the cutting knives.

Another purpose is to provide such a cereal cutter which is readily adjustable from the exterior to provide any desired maximum size of material so that the cutter can be efficiently used in cutting small batches of grain in which different sizes are required to be produced.

Another purpose is to provide a rotary cutter head which is cylindrical in form and from the periphery of which only a small extent of the blades project. This not only prevents the rotary cutter head from becoming clogged but also prevents very substantial amounts of the partly cut grain from being carried around with the head, such carrying around being disadvantageous since it not only increases the power required to operate the rotary head but also results in a grinding action on the kernels and reduces the uniformity of the product.

Another object is to improve the cutting efficiency of the cereal cutter, in particular to so arrange the stationary knife as to meet the rotary knives at an angle, this arrangement having been found to provide cleaner cutting with less power and to reduce breakage of the kernels and wear upon the knives.

Another object is to provide a simple and secure means for mounting the knives to project from the periphery of the rotary cutter head, these means being of simple construction, permitting ready access to the knives for the purpose of adjusting, resharpening and replacement and also serving to securely hold the knives in their adjusted operative position.

Other purposes are to provide such a cutter in which there is no danger of uncut or oversize grain passing through the machine; is entirely adjustable throughout; can be readily taken apart and cleaned or repaired; provides no space for the accumulation of materials; is extremely simple and inexpensive in construction and will operate at high efficiency for a long period of time and under adverse conditions without getting out of order or requiring resharpening or replacement of any of the elements.

In the accompanying drawings:

Fig. 1 is a vertical longitudinal sectional view through a cereal cutter embodying my invention.

Fig. 2 is a vertical transverse section through the cereal cutter.

Fig. 3 is an enlarged fragmentary section, taken on line 3—3, Fig. 2.

Fig. 4 is a perspective view of a backing plate for one of the knives, these backing plates jointly forming the periphery of the cylindrical rotary cutter head and also serving to hold the knives in properly adjusted position.

Fig. 5 is a fragmentary perspective view of one of the cutting blades.

While the form of the cutter can be varied greatly as to detail, as shown in the drawings, the invention is applied to a grain cutter having end heads 15 to which side plates 16 and 17 are secured in any suitable manner as by providing flanges on the side plates 16 and 17 and securing these to the end heads 15 by fastenings 18. The upper ends of the end heads 15 are rounded and carry a sheet metal cover 19 which rises from the side plate 16 and terminates near the top. To the end heads are also secured by screws 20 or in any other suitable manner a cross bar 21 which extends downwardly from the upper end of the top 19 and forms one wall of a hopper 22. The wall 17 is formed at its upper end to provide an inwardly extending shelf 23 which slopes upwardly and inwardly from the wall 17 and, as hereinafter described, carries the stationary cutting blade and above this shelf is arranged an angular plate 24 having a lower part 25 which is arranged parallel with and above the shelf 23 and an upper part 26 which forms a support for the lower inclined wall 27 of the hopper 22.

This hopper 22 includes a sheet metal structure having end walls 28 and side walls 29. One of the side walls 29 fits against the bar 21 and the inclined wall 27 rests upon the upper leg 26 of the angular plate 24, the lower end of the inclined wall 27 extending downwardly past the throat of the hopper and into close proximity to the stationary cutting blade, as hereinafter described.

The rotary cutter head, indicated generally at 30, includes a shaft 31 suitably journaled in roller bearings 32 provided in the end heads 15, which roller bearings are preferably so constructed that they can be packed with grease. This shaft 31 can be provided with a drive pulley 33 which is adapted to be connected to a power source by a belt (not shown). The shaft 31 is shown as provided with a spline groove 34 and on this shaft is secured a plurality of square heads 35, each of these heads being secured by a key 36 to the spline groove 34. To hold the square heads 35 against axial displacement, screws 38 are provided which extend into screw holes provided in the main shaft 31.

The square heads 35 are of identical size and shape and are arranged so that each face of each head lies in the same plane as the corresponding faces of the other two heads. These heads are arranged so that one is at the center of the shaft 31 and one adjacent each end head 15 and four knife blades 40 are secured to the four faces of each of these square heads, each of these knife blades being thereby supported at its center and at its opposite ends on a corresponding square head 35.

Each of the knife blades 40 is in the form of a flat blade of elongated rectangular form with its opposite longitudinal edges sharpened to provide cutting edges, as hereinafter described, only one of these cutting edges being used at one time. As best shown in Fig. 5, each of the cutters 40 is provided with three slots 41 which are elongated transversely of the blade and register with screw holes 42 provided at the center of each of the four faces of each square head 35. The blades 40 are secured by screws 43 which extend through the slots 41 into the screw holes 42. It will therefore be seen that upon loosening the screws 43 for one blade 40, the elongated slots 41 permit of adjusting this blade transversely of the axis of the shaft 31, thereby to adjust the cutting effect of this blade as well as to permit of compensating for the narrowing of the knife blade through repeated resharpening.

The body of the rotary cutter 30 is of cylindrical form, the periphery of the cylindrical cutter being provided by a backing plate 45 for each knife, these backing plates 45 being secured in position by the screws 43. As best shown in Fig. 4, each of these backing plates 45 is formed to provide a curved face 46 which is concentric with the axis of the main shaft 31 when secured in position by the screws 43 so that these curved faces 46 of the four backing plates 45 jointly provide a cylindrical face when assembled in the rotary cutter 30. At one side the curved face 46 of each knife terminates in a feather edge 48 which is provided by a flat face 49 adapted to bear against the face of the blade 40 to which it is secured by the screws 43. On its opposite side from its feather edge 48 each backing plate 45 is formed to provide a flat face 50 which is arranged at right angles to its flat face 49 and serves to provide a shoulder against which the adjacent knife blade 40 is held by its backing plate 45, the flat face 50 of each backing plate being coplanar with the adjacent faces of the square heads 35 for this purpose. To reduce the weight of each backing plate 45 its face 49 can be hollowed out, as indicated at 51, between its ends and between the three holes 52 which receive the heads and shanks of the screws 43 which hold the knife blades 40 and backing plates 45 in position.

In assembling the rotary cutter head 30 a knife blade 40 is placed on three corresponding flat faces of the square heads 35, this blade being arranged eccentrically to the shaft 31 so that one of its cutting edges is arranged in opposition to the direction of rotation of the shaft 31, this being clockwise, as viewed in Fig. 2. On this blade 40 is then arranged one of the backing plates 45, this backing plate being so arranged that its feather edge 48 is in juxtaposition to the effective cutting edge of its blade 40 and so that its flat face 50 is coplanar with the next succeeding faces of the square heads 35. The screws 43 are then inserted through the holes 52 in this backing plate, slots 41 in this blade 40 and into the corresponding screw holes 42 of the square heads 35. The second cutting blade 40 is then positioned against the next succeeding faces of the square heads 35 with its inner face against the flat face 50 of the backing plate 45 just assembled and with its effective cutting edge projecting outwardly from the curved face 46 of this backing plate 45 just assembled. A second backing plate 45 is then secured by its screws 43 in the same manner as with the first backing plate. The third and fourth sets of blades 40 and backing plates 45 are secured by screws 43 to the remaining faces of the square heads 35 in the same manner and the completely assembled cutter head 30 thereby is in the form of a cylinder, the periphery of which is jointly provided by the curved faces 46 of the four backing plates 45, the blades 40 projecting outwardly from this periphery at right angles to each other and each parallel with a radius of the rotary cutter 30.

Before tightening the screws 43, each of the blades 40 is adjusted to project outwardly from the cylindrical surface provided by the curved faces 46 of the backing plates 45 to an extent determined by the desired size of the granular cut material produced by the cutter. The screws 43 are then tightened to hold the cutters 40 in this adjusted position.

The projecting cutting edges of the several rotary cutter blades 40 cooperate with a stationary cutter blade 55 which is mounted on the angular shelf 23 and which is secured thereon by screws 56 the shanks of which extend through transversely extending elongated slots 58 provided in the stationary cutter blade 55. It will particularly be noted that since the stationary blade 55 is mounted on the shelf 23 which inclines upwardly and inwardly toward the center of the machine, the stationary cutting blade 55 is arranged at an angle to each rotary cutter blade which it meets. It is apparent that upon loosening each of the screws 56 the stationary blade 55 can be adjusted inwardly or outwardly to follow the blades 40 as they are adjusted inwardly or outwardly.

It will be seen that the size of the grain when cut is determined by the extent to which the movable cutter blades 40 are adjusted inwardly or outwardly and not by the gap between the rotary cutter blades 40 and the stationary cutter blade 55. Thus, upon reference to Fig. 2, it is apparent that upon adjusting the rotary cutter blades 40 inwardly a much smaller cut will be taken off from the grain than when it is adjusted outwardly. The stationary blade 55, however, must be adjustable since it is desirable to have the gap between the blades as small as possible. The rotary blades are therefore adjusted to provide the desired size of the comminuted material and the stationary blade 55 is brought up to provide the desired space between it and the rotary blades. It is also apparent, as best shown in Fig. 2, that the effective part of the cutter head 30 is cylindrical in form and is broken only by the slight extension of the cutter blades out from the peripheral face provided by the curved faces 46 of the several backing plates 45. By this means the tendency of the rotary cutter head 30 to pick up and idly carry around a large quantity of partly cut or uncut grain is greatly reduced since the only impellers provided are the comparatively small extensions of the blades 40.

Instead of employing straight cutting edges on each of the rotary and stationary blades 40 and 55, each cutting edge of each of these blades is preferably serrated and indented, as best shown in Fig. 5. In providing such a cutting edge each longitudinal side of each blade is first beveled, as indicated at 63. The face of the blade adjacent each sharper edge formed by this bevel 63 is then formed to provide a plurality of notches 64 which are V-shaped in cross section and arranged one after the other the full length of the cutting edge. With the blade formed in this manner it is apparent that in plan the cutting blades are provided with a plurality of V-shaped teeth 65 of regular form and that these teeth are also V-shaped when viewed edgewise of the knife. These teeth, therefore, have sharp cutting points and provide a serrated edge. The stationary cutting knife 55 is arranged with the sharp points of its effective cutting teeth extending upwardly and the rotary knives 40 during their effect movement past the stationary cutting knife 55 have their cutting points facing downwardly. The points of the stationary and rotary cutting blades preferably are arranged to pass in intermeshing relation so that the space between the rotary and stationary blades is of zig-zag form of uniform width.

The rotary cutter 30 is embraced by a screen 66 which is generally of semi-cylindrical shape and is provided at its opposite longitudinal edge with a flange 68, this flange being secured by screws 69 to the lower part of the cross bar 21 of the cutter frame. Along the lower longitudinal edge of the screen 66 is secured an angle iron 70, this angle iron being arranged to project outwardly from the corresponding edge of the screen and being secured at its ends to the shelf 23 by screws 71 or in any other suitable manner. The screen 66 is made of sheet metal which is punched to provide a plurality of evenly spaced round perforations 73. This screen insures against oversize grain passing through the cutter. It will be noted that while a small amount of grain is carried around, ineffectively, by the rotary cutter blades 40, the grain so carried around is very small in amount because the cutter head is cylindrical in form and the spacing between the periphery of the cutter head and the screen 66 is very small. By this means the churning of large amounts of grain in idly passing around with the cutter head is avoided and the consequent grinding action upon and heating of this grain is avoided. In cutting very large sized material this screen 66 can be eliminated, however.

In order to retard the velocity of the stream of grain flowing through the hopper 22 to its throat retarding baffles 75 can be provided in this hopper. The cut grain falling from the screen 66 is also preferably directed by an inclined apron 76 to one side of the cutter where it can be conveniently collected and conveyed away.

In operation it is apparent that the stream of grain admitted to the hopper 22 is retarded in its downward movement by the baffle 75 and passes through the throat at the lower end of this hopper into the zone of action of the cutting blades. The rotary blades 40 then engage the grain resting upon the stationary blade 55 and cut off a slice or piece of each grain, the size of this slice or piece being determined by the degree to which the rotary blades 40 project outwardly from the cylindrical surface provided by the curved faces 46 of the several backing plates 45. Since both the stationary and rotary knives are formed to provide sharp serrated teeth this cutting is effected with the expenditure of a very little power. The cut pieces or slices of grain thereupon pass downwardly into the semi-cylindrical screen 66 and, if sufficiently small, pass through the perforations in this screen. Since the teeth 65 of the cutting knives are serrated in form and intermesh with one another it is apparent that practically all of the grain will be cut to a maximum size and will pass through the screen. Such small quantities as are not cut to this maximum size are carried around by the rotary knives 40 and brought back to the throat of the hopper 22. This is a very small quantity, however, and by reason of the cylindrical form of the rotary cutter head 30 there is no tendency for this partially cut grain to collect in the rotary cutter and be carried around and around until it is ground down to the required maximum size as would be the case if the rotary cutter head were not cylindrical. Such grinding not only produces waste in the form of powder but also results in the highly undesirable result of heating the grain.

An important feature of the invention resides in the fact that the stationary blade 55 is mounted at an angle so that each rotary blade 40 is at an angle to the stationary blade when they meet and so that the sharp edges of the rotary and stationary knives are in direct opposition as they approach each other with the bevels 63 of the stationary knife 55 and the corresponding rotary knife 60 substantially parallel with each other at this time. By this angular arrangement of the stationary and rotary knives, as they meet, it has been found that the cutting efficiency of the cutter is greatly increased and the power required to operate the cutter greatly reduced. A further feature of the invention resides in the provision of a built up rotary cutter of the character described. By making the rotary cutter in the form of a simple shaft carrying square heads, to the faces of which the knives are secured by backing plates, and by so shaping these backing plates that they jointly provide a cylindrical surface for the body of the rotary cutter and also have two flat faces which abut the corresponding sides of two of the rotary cutter blades 40, it will be seen that the rotary cutter head 30 of the present invention can be produced at low cost and at the same time renders the knives readily accessible and removable for adjustment, removal for resharpening and replacement.

From the foregoing it will be seen that the present invention provides a very simple and inexpensive cereal cutter which operates at high efficiency and requires a very small amount of power to run. The grain is also uniformly cut to a maximum size and is uniformly graded. The cutter also avoids, as far as possible, all grinding action and heating of the grain. The rotary cutter head of the machine is also readily assembled from simple parts and the cutting blades easily adjustable thereby adapting it to small batch work. The cutter is also easily cleaned and repaired, is extremely compact and will stand up under conditions of severe and constant use without getting out of order.

I claim as my invention:

A substantially cylindrical, relatively light weight, skeleton-like rotary cutter head for a cereal cutter, comprising a central shaft, a plurality of similarly shaped heads secured to said shaft at spaced intervals and being polygonal in cross section to provide flat faces which join at an angle to each other, said faces being arranged in common planes, flat cutter blades directly engaging said faces and having cutting edges projecting outwardly from the corresponding angles formed by said faces, a single backing plate for each of said flat cutter blades and each having a flat face engaging the outer face of the corresponding cutter blade along a continuous longitudinal portion of the outer face of the cutter blade immediately adjacent the outwardly projecting cutting edge thereof, and each backing plate also having an opposite curved face meeting said flat face in a feather edge at one side of said backing plate and providing with the curved faces of the other backing plates a substantially cylindrical and continuous periphery for the rotary cuttery with the cutting edges of said blades projecting outwardly from said periphery and each backing plate also having a second flat face opposite said feather edge and arranged at an angle to said first flat face which is complementary to the angles formed by said polygonal flat faces and directly engaging the inner face of the succeeding cutter blade along a continuous longitudinal portion of the inner face of the said succeeding cutter blade immediately adjacent the outwardly projecting cutting edge thereof to form a backing support therefor, said backing plate being also interiorly hollowed out, and means securing each of said backing plates and the corresponding cutter blade to the corresponding face of each of said heads.

FRED C. IELFIELD.